United States Patent [19]
Choate

[11] Patent Number: 5,668,665
[45] Date of Patent: Sep. 16, 1997

[54] TELECENTRIC, PARFOCAL, MULTIPLE MAGNIFICATION OPTICAL SYSTEM FOR VIDEOINSPECTION APPARATUS

[75] Inventor: Albert G. Choate, Rush, N.Y.

[73] Assignee: Optical Gaging Products, Inc., Rochester, N.Y.

[21] Appl. No.: 499,870

[22] Filed: Jul. 10, 1995

[51] Int. Cl.$^6$ .................................................. G01J 1/20
[52] U.S. Cl. .................................. 359/663; 250/201.1
[58] Field of Search .............................. 359/663, 821; 250/201.1, 234

[56] References Cited

U.S. PATENT DOCUMENTS 5,389,774  2/1995  Gelman et al. ................. 250/201.1

FOREIGN PATENT DOCUMENTS 0150846  6/1989  Japan ............................ 250/201.1

*Primary Examiner*—Michael J. Tokar
*Assistant Examiner*—Richard Hanig
*Attorney, Agent, or Firm*—Shlesinger, Fitzsimmons & Shlesinger

[57] ABSTRACT

An objective lens is secured in an afocal mode to a support for movement vertically toward and away from a workpiece. An illumination collimator fixed on the support above the objective lens projects the image of a reticle downwardly and successively through a second lens assembly, a beamsplitter plate, and coaxially of the objective lens to the workpiece. A combined image of the reticle and workpiece is then projected by the objective lens upwardly onto the beamsplitter, and laterally to a mirror which projects the combined image upwardly along an axis spaced from and parallel to the axis of the objective lens, and through one of several different magnifying lens assemblies to the image detector of a video camera. The magnifying lens assemblies can be selectively indexed one at a time into registry with the camera, and each has a telecentric opening or stop which always registers with the rear focal point of the objective lens each time such assembly is indexed into its operative position.

15 Claims, 3 Drawing Sheets

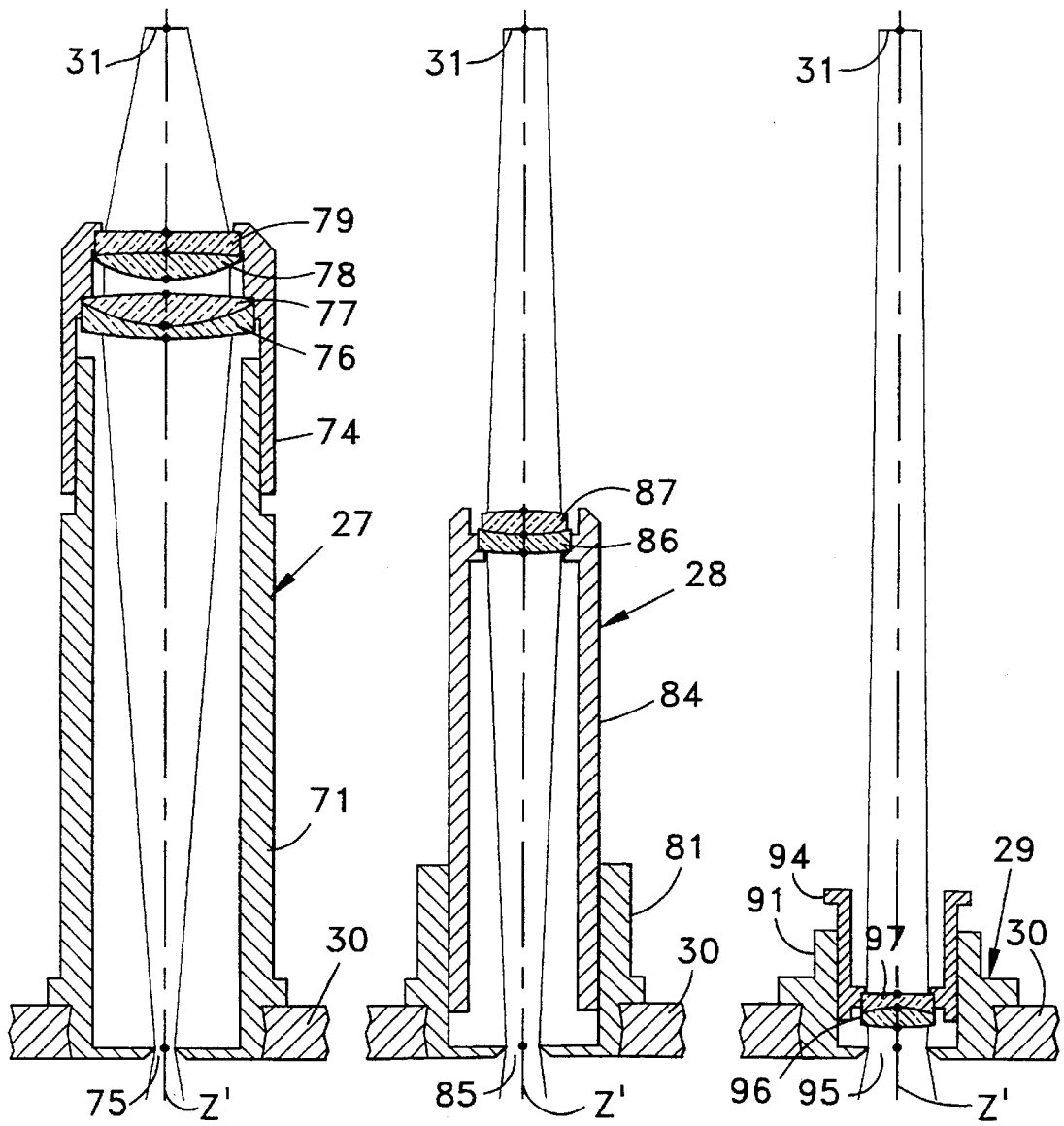

TELECENTRIC, PARFOCAL, MULTIPLE MAGNIFICATION OPTICAL SYSTEM FOR VIDEOINSPECTION APPARATUS

BACKGROUND OF THE INVENTION

This invention relates to optical systems for metrological measuring apparatus, and more particularly to an improved telecentric, parfocal optical system having means for selectively indexing any one of a plurality of different magnifications into registry with a video camera that forms part of the measuring apparatus. Even more particularly, this invention relates to an improved optical system of the type described which utilizes a single, fixed entrance lens assembly for all magnifications.

In metrological apparatus of the type described it is customary to employ a worktable defining an object plane in which the workpiece to be inspected is positioned and illuminated. As disclosed for example in U.S. Pat. No. 5,389,774, an image of the workpiece can then be projected by an associated optical system to a video camera, and from there via a microprocessor or CPU control to an associated TV monitor, or the like. In certain such optical systems it has been customary to employ a zoom lens mechanism to vary the magnification of the image that is projected to the associated video camera. While such apparatus is particularly suitable for inspection of selected objects, it does have the disadvantage that the degree of magnification of the inspected object is limited by virtue of the nature of a conventional zoom lens mechanism. Moreover, even where such variations in magnification of an image can be effected, most such prior art devices do not use telecentric, parafocal optical systems for all such magnifications.

Moreover, still other prior art metrological apparatus, such as disclosed for example in U.S. Pat. No. 4,743,771, includes a beam splitter for reflecting an image of a grid or reticle onto the surface of a workpiece that is being inspected. The combined images of the reticle and workpiece are then projected upwardly along a vertical axis (z) to a video cmaera for use in effecting automatic focusing of the apparatus. Such apparatus, however, includes no means for providing different magnifications of the images. Moreover, by using a beamsplitter to reflect the reticle image through the imaging lenses, objectionable stray light reflections off the optical elements, as caused by the illumination of the workpiece surface, reduce the contrast between the reticle image and the workpiece image.

It is an object of this invention, therefore, to provide for metrological apparatus of the type described an improved optical system capable of selectively providing any one of a plurality of different magnifications of the image that is projected to the video camera of the apparatus.

Another object of this invention is to provide an improved optical system of the type described which is always telecentric and parfocal for all magnifications of the system.

Still another object of this invention is to provide an improved optical system of the type described which utilizes a single, fixed entrance lens assembly for each possible magnification of the system.

It is an object also of this invention to provide for apparatus of the type described a telecentric, variable magnification optical system of the type in which each magnification has a different F-stop aperture, and each such F-stop, when in use, is always located at the back focal point of the system's entrance lens assembly.

A further object of this invention is to provide an optical system of the type described including means for injecting a reticle image and normally directed surface illumination between the entrance lens assembly and the system's telecentric stop location, whereby the E-number for the reticle projection means may be less than that of the imaging lens system.

Other objects of this invention will become apparent hereinafter from the specification and from the recital of the appended claims, particularly when read in conjunction with the accompanying drawings.

SUMMARY OF THE INVENTION

An objective lens assembly having a fixed front focal point is secured in an afocal mode to a support for movement thereby vertically along a first or Z axis toward and away from a workpiece. An illumination collimator which is fixed on the support above the objective lens assembly, projects the image of a reticle downwardly along a second axis parallel to and nearly coaxially of the first axis, and successively through a second lens assembly, a beamsplitter plate, and the objective lens assembly to the workpiece. Combined images of the reticle and workpiece are then projected by the objective lens assembly upwardly onto the beamsplitter, and laterally therefrom to a mirror which projects the combined images upwardly along a third axis spaced from and parallel to the first and second axes, and through a magnifying lens assembly to the image detector of a video camera which is fixed on the support above the magnifying lens assembly.

The magnifying lens assembly is one of a plurality of different such assemblies which can be selectively indexed into registry with the camera to project a magnified image of the combined workpiece and reticle images to the camera's image detector. Each such magnification lens assembly has a telecentric opening or stop which always registers with the reflecting mirror at a fixed, constant distance from the objective lens assembly each time such assembly is indexed into its operative position. Because the workpiece illuminating light beam and reticle image are projected through the objective lens assembly at a point between the objective lens and the telecentric stop, it is possible to use for the reticle projecting lens system an F-number less than that of any of the imaging lens magnification systems. This enables a shallower depth of focus, and consequently improved auto-focus measurement capabilities along the Z axis.

THE DRAWINGS

FIG. 1 is a schematic elevational view of a telecentric, parfocal optical inspection system made according to one embodiment of this invention, the system and its associated video camera being mounted for vertical movement relative to a workpiece that is to be inspected, and including means for selectively interposing any one of four different magnification lens assemblies between the video camera and the workpiece;

FIGS. 4 to 6 are enlarged fragmentary sectional views taken, respectively, along vertical planes containing the axes of the three other magnification lens assemblies shown in FIG. 1.

DETAILED DESCRIPTION OF THE PREFERRED EMBODIMENTS

Figure 1:
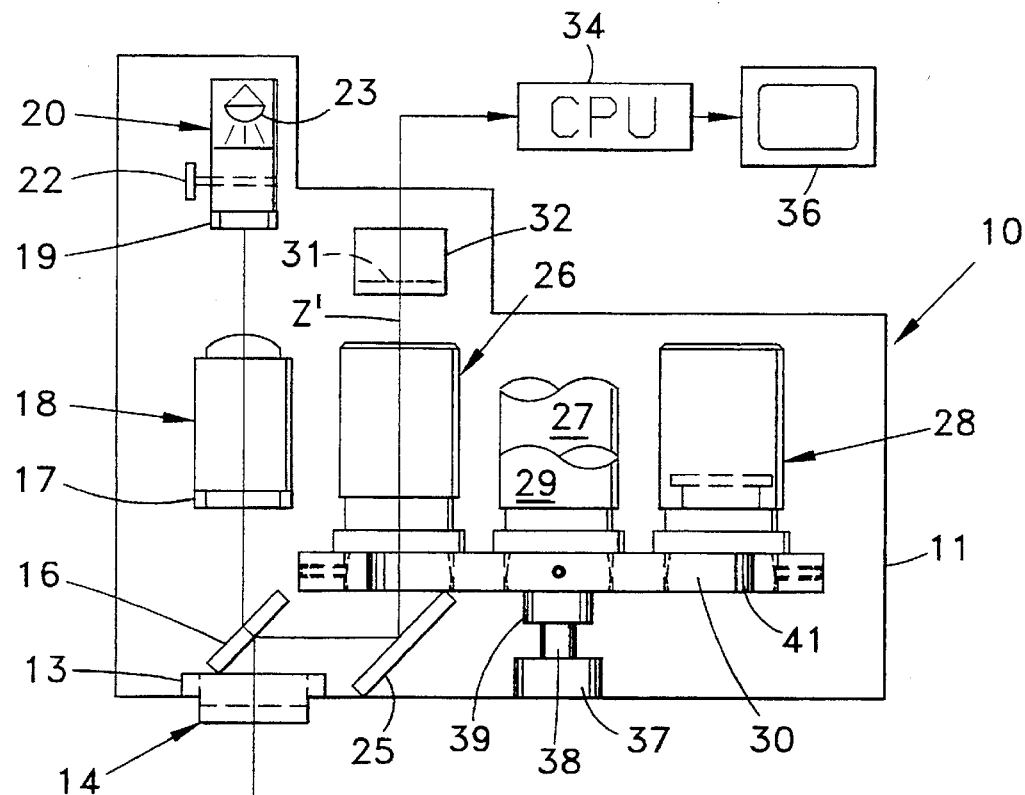
Figure 2:
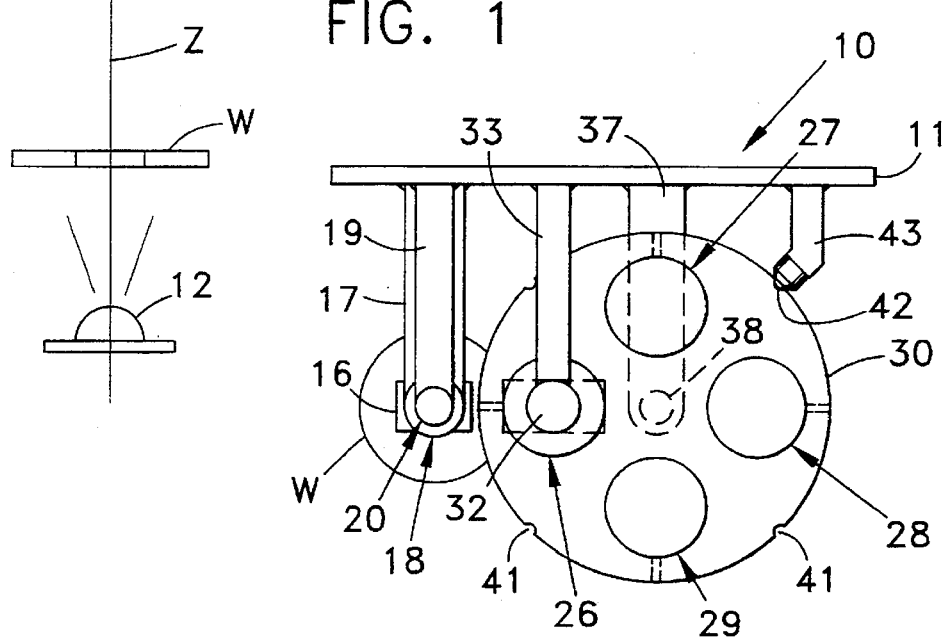
FIG. 2 is a fragmentary plan view of this system on a smaller scale.

Referring now to the drawings by numerals of reference, and first to FIGS. 1 and 2, 10 denotes generally a multi-magnification optical system comprising a slide 11, which is mounted in a conventional manner for vertical movement parallel to a vertical axis denoted at Z, and toward and away from an object plane represented by the horizontal upper surface of a conventional worktable W. In the embodiment illustrated, this table W is disposed to be mounted above a substage illumination collimator 12, which registers coaxially with the axis Z and an opening in the worktable W, so that if desired a profile image of the workpiece on the table W can be projected upwardly along axis Z.

Mounted on slide 11 by a bracket 13 to overlie table W, and with its optical axis disposed coaxially of the axis Z, is a fixed objective or entrance lens assembly 14. This assembly, which is mounted adjacent the lower end of the support 11, registers coaxially at its upper end with a beamsplitter plate or disc 16, which is supported on slide 11 by a bracket 15 (FIG. 3) and in a plane inclined at 45 degrees to the horizontal. Supported by a bracket 17 on slide 11 above the beamsplitter 16 is a surface illumination and reticle projection lens assembly 18 having a vertical axis which is disposed approximately coaxially of the axis Z and the center of the beamsplitter 16. Supported by another bracket 19 on slide 11 to overlie the upper end of the lens assembly 18 is a surface illumination collimator device 20 having therein a removable reticle 22, such as a grid or a series of concentric, alternating dark and light rings, and a lamp 23.

Illumination from lamp 23 projects an image of the reticle 22 via the lens assembly 18, the beamsplitter 16 and the entrance lens assembly 14 onto the object plane represented by the upper surface of the worktable W, thereby illuminating the surface of any workpiece on the table, and projecting onto such workpiece an image of the reticle 22. The combined images of the reticle 22 and the workpiece are then projected upwardly through the entrance lens assembly 14 and onto the underside of the beamsplitter 16, which causes the images to be projected laterally (to the right in FIG. 1) onto the face of an inclined mirror 25. Mirror 25 is secured by a bracket 24 (FIG. 3) to slide 11 to have the upper surface of the mirror disposed in spaced, parallel relation to the underside of the beamsplitter 16, whereby the combined images from the beamsplitter are projected upwardly by mirror 25 along an axis Z' through a magnification lens assembly 26, which is one of four different such assemblies 26, 27, 28 and 29 that are supported at their lower ends in registering openings in a circular turret wheel or plate 30. Wheel 30 is mounted, as noted in greater detail hereinafter, for rotation indexibly about a vertical axis parallel to the axes Z and Z'. The combined images of the workpiece and reticle 22 are then projected by the lens assembly 26 to the image detector 31 in a conventional video camera 32, which is supported by a bracket 33 on the slide 11 to have its image detector 31 overlie the upper end of the magnification lens assembly 26 coaxially of the axis Z'. The combined images are then transmitted in a conventional manner, which forms no part of this invention, via an associated microprocessor or CPU device 34 to a video monitor 36 for observation by an operator of the equipment.

Referring again to the turret wheel 30, a bracket 37 that projects from slide 11 adjacent its lower edge has on its outer end a vertically disposed shaft 38. A bearing 39, which is rotatably mounted on the upper end of shaft 38, is secured coaxially to the underside of wheel 30 to support it for rotation, as noted above, about an axis spaced from and parallel to the axes Z and Z'. The four different magnification lens assemblies 26-29 are equi-angularly spaced 90° from each other about the axis of wheel 30. The wheel 30, in turn, has in its outer peripheral surface four equi-angularly spaced, segmental spherical recesses or notches 41, each of which is movable upon rotation of the wheel 30 selectively into registering engagement with a spring-loaded ball detent 42, which is mounted on the outer end of another bracket 43 that projects from slide 11. In this manner, each time one of the magnification lens assemblies 26-29 is moved into operative registry with the mirror 25 and camera 32, and coaxially of the axis Z', one of the notches 41 will be engaged with the detent 42, thereby to retain wheel 30 against further rotation during use of the desired magnification lens assembly.

Figures 3, 7:
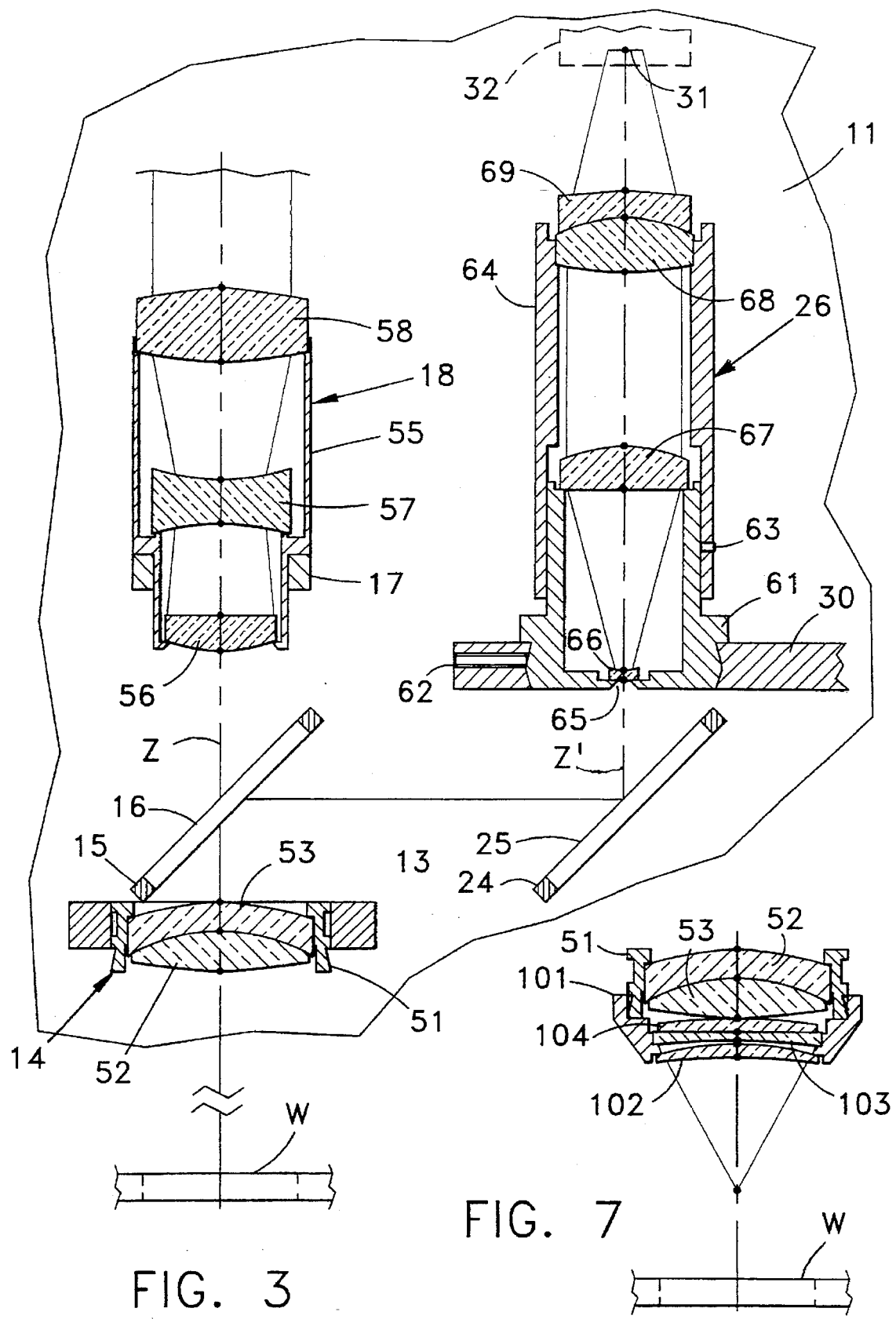
FIG. 3 is an enlarged, fragmentary sectional view taken along a vertical plane containing the axes of the entrance lens assembly and one of the magnification lens assemblies shown in FIG. 1.
FIG. 7 is a fragmentary axial sectional view of a booster lens assembly which may be attached to the entrance lens assembly employed in this system.

Referring now to FIG. 3, the entrance lens assembly 14 comprises a conventional lens barrel 51 containing an achromatic lens doublet in the form of a convergent lens 52 facing the worktable W, and a divergent lens 53 facing the underside of the beamsplitter 16. The assembly 18, which overlies the beamsplitter 16, has an F/number of F/4, and comprises also a conventional lens barrel 55 having cemented in its lower end a plano-convex lens 56, the plane upper surface of which is axially spaced beneath a double concave lens 57, which is secured in the barrel 55 intermediate its ends. Secured in the upper end of the barrel 55 with a portion thereof extending axially above the upper end of the barrel is a double convex lens 58, which registers with the opening in the lower end of the device 20. Collimated light from the lamp 23, together with an image of the reticle 22, are projected through lens assembly 18, beamsplitter 16, and the entrance lens assembly 14 onto table W and any workpiece thereon.

The magnification lens assembly 26 comprises a lower lens barrel 61, the lower end of which is fixed by a set screw 62 in a registering opening in the indexible support 30. Secured adjacent its lower end coaxially over the upper end of the barrel 61 by another set screw 63 or the like, is an upper lens barrel 64. Barrel 61 has formed coaxially in the lower end thereof a small, circular opening 65, which forms a fixed telecentric stop. A small, plano-concave lens 66, which is secured in the lower end of barrel 61 over the opening 65, is disposed to project an image upwardly in barrel 61 to the plane under surface of a plano-convex lens 67, which is secured coaxially over the upper end of barrel 61, and which projects into the bore of barrel 64 intermediate the ends thereof. Lens 67 projects an image upwardly in barrel 64 to a lens doublet comprising lenses 68 and 69, which are secured coaxially in the upper end of barrel 64. This lens doublet, in turn, projects an image (or images) upwardly to the image detector 31 of the video camera 32. In order properly to focus the lens doublet 68, 69 relative to the lenses 66 and 67, the set screw 63 is backed off to enable the desired vertical adjustment of the barrel 64 on the barrel 61, after which set screw 63 can be tightened to secure these barrels against axial movement relative to each other.

In the embodiment shown in FIGS. 1 to 3, wherein the magnification lens assembly 26 is in its operative position between the mirror 25 and camera 32, the beam limiting, telecentric stop 65 has an F/number of F/56, and is located at the back focal point of the entrance lens assembly 14. By way of example, the fixed, front focal point of lens assembly 14 is approximately 105 mm. along the axis Z toward the worktable W. Again, by way of example, the entrance lens assembly 14 may be positioned 25 mm from the bottom surface of the beamsplitter 16, the center of which may be 58 mm from the center of the mirror 25; and the center of mirror 25 may be positioned slightly over 27 mm from the telecentric stop 65. The overall optical distance from the entrance lens assembly 14 to the telecentric stop 65 would then be approximately 110 mm. This distance, it is to be noted, would be the same for each magnification lens assembly 26 through 29 when indexed into an operative position between the mirror 25 and the focal point 31 of the camera 32. Also, the lens assembly 18, which will be the same for all embodiments of the invention, is fixed above the upper surface of the beamsplitter 16 so that its lower end is positioned an optical distance of approximately 22.5 mm from the upper surface of the beamsplitter 16.

This optical system has the effect of projecting to the camera 32 an image which is approximately one-quarter or 25% of the size of the image of the workpiece on table W that is transmitted by the entrance lens assembly 14. To focus the entrance lens 14 on any particular surface of the workpiece, the slide or support 11 can be adjusted vertically by conventional means which form no part of this invention, and which therefore are not illustrated in detail herein. Because of the telecentricity provided by the fixed entrance lens assembly 14 and the associated telecentric stop 65, imaging beams are parallel to the optical axis over the full object field, so that a respective image size is maintained despite any slight changes from the exact focus of the system, and therefore will not greatly change the apparent size of the object or workpiece which is being viewed.

Referring now to FIG. 4, the magnification lens assembly 27 is designed to project a telecentric image one-half the size of the image transmitted by the entrance lens assembly 14. Assembly 27 comprises a lower barrel 71, the lower end of which is secured in a registering opening in the indexible support 30 in such manner that when the assembly 27 is rotated into an operative position between the mirror 25 and camera 32 the barrel 71 is disposed coaxially of the axis Z'. Barrel 71 has at its lower end (the left end in FIG. 4) a small, truncated conical opening 75 forming a telecentric stop of F/28 which, as in the case of the stop 65 in the lens assembly 26, is disposed to be located at the back focal point of the entrance lens assembly 14, when assembly 27 has been indexed into its operative position. Secured over the upper end of barrel 71 coaxially thereof is an upper barrel 74, which has secured coaxially therein adjacent its upper end a first lens doublet comprising lenses 76 and 77, and axially spaced B therefrom, and located immediately adjacent the upper end of barrel 74, a second lens doublet comprising lenses 78 and 79. As in the case of the lens assembly 26, the barrel 74 is adjusted axially relative to barrel 71 properly to focus the two lens doublets relative to the telecentric opening 75, after which the barrel 74 is secured against movement relative to barrel 71 by a set screw or the like, (not illustrated). As noted above, when the lens assembly 27 is indexed into operative position by rotation of the support 30 counterclockwise 90° from its position as shown in FIG. 2, the image projected to the image sensor 31 of the camera 32 will be one-half the size of the image transmitted by the entrance lens assembly 14 to the lens assembly 27.

The assembly 28 as shown in FIG. 5 comprises a lower barrel 81, which is secured at its lower end in a registering opening in the indexible support 30, and which has formed in its lower end coaxially thereof an opening 85 forming a telecentric stop number of F/14. When the assembly 28 is rotatably indexed by the support 30 into an operative position between the mirror 25 and the camera 32, the stop or telecentric opening 85, as well as the barrel 81, will be disposed coaxially of the axis Z'. An upper barrel 84, which is secured coaxially at its lower end of the bore of the lower barrel 81, has secured at its upper end a lens doublet comprising lenses 86 and 87 which also are disposed coaxially of the axis Z', when the assembly 28 is in its operative position between mirror 25 and camera 32. In this position the assembly 28 transmits to the camera 32 an image which will be equal in size to the image of the object or workpiece that is projected via the entrance lens assembly 14.

As shown in FIG. 6, the lens assembly 29 comprises a lower barrel 91, which is secured at its lower end in a registering opening in the support 30, and which has in its lower end coaxially thereof a telecentric stop or opening 95 having an F-number of F/8. Adjustably secured at its lower end in the upper end of the barrel 91 is an upper barrel 94. Barrel 94 has fastened therein adjacent its lower end a lens doublet, which is disposed in axially-spaced, confronting relation to the opening 95, and which comprises the two lenses 96 and 97. When indexed into its operative position by the support or wheel 30, the lens assembly 29 transmits to camera 32 an image which is twice the size of the image transmitted to assembly 29 by the entrance lens assembly 14.

From the foregoing it will be apparent that the present invention provides a multiple magnification system, which utilizes a fixed entrance lens assembly which is common for each of the four different magnification assemblies employed therewith, thus enabling the establishment of telecentricity for all magnifications of the system. Each of the magnification lens assemblies includes its own beam limiting telecentric stop, which is always located in the same position as each respective magnification lens assembly is indexed into an operative position with respect to the associated video camera. In addition, the lens system 18, which is used to inject surface illumination for the worktable functions also to project onto a workpiece W an image of the reticle 22 (for example a grid) to provide artificial contrast in the image. Because the light beam and the reticle image are projected by lens system 18 approximately along the Z axis, and between the entrance lens assembly 14 and the telecentric stop location, it is possible to use for the reticle projection system 18 an F-number less than that of the imaging lens systems 26–29, thereby exhibiting a shallower depth of focus. Whereas depth of focus is an asset when viewing the object directly, this reduced depth of focus of the reticle image provides improved auto-focus Z measurement capabilities. That using a beamsplitter to inject the reticle image through the imaging lenses would eliminate the need for an additional projection lens, but the low F-number method cannot be exploited, and increased objectionable stray light reflections of the surface illumination off the optical elements is encountered, since this is then part of the imaging path as well.

Still another advantage of using the two independent lens systems 18 and 26, which share only the entrance lens doublet 14 is that it is possible in this configuration to use a beamsplitter plate, rather than a beamsplitter cube, which tends to produce objectionable reflection of the reverse directed surface illumination. In order to enable the front focal point of the fixed entrance lens assembly to be focused upon the desired surface of a workpiece on table W, the above-noted lens systems, the light source and the camera are mounted on a slide or housing for vertical adjustment relative to the worktable. The resultant system provides a precision imaging and illumination paths with large working distance, tolerable aberrations, and reduced stray light.

In practice, the distance from the common telecentric location or stop to the video camera 32 is chosen to be slightly larger than twice the focal length of the entrance lens assembly 14. This makes it possible to produce a magnification of 1X - i.e., an image equal to the size of the image transmitted by the entrance lens assembly 14 - with a simple doublet 86, 87 located approximately midway between the stop 85 and the camera image detector 31, thus effectively creating a unit magnification relay system with naturally small optical aberrations. This also permits a rather simple doublet 96, 97 to be employed to produce a 2x magnification with such lenses being disposed in close proximity to the associated stop 95.

While the system 10 disclosed herein illustrates usage of only four different magnification lens assemblies, it will be readily apparent to one skilled in the art that the support 30 could be readily modified to accommodate additional magnification lens assemblies, for example 4X and 8X assemblies to project to camera 32 images four times and eight times, respectively, the size of the image projected by the entrance lens assembly. Moreover, and particularly in connection with 4X and 8X magnifications, the image projected to the camera may be further magnified by attaching a booster lens assembly to the entrance lens assembly.

For example, as shown in FIG. 7 a barrel 101, which may be releasably attached in any conventional manner to the lower end of barrel 51 of assembly 14, has a convex lens 102 secured in its lower end, and a doublet comprising lenses 103 and 104 secured in its upper end. The booster lens assembly comprising lenses 102–104 operates to double the size of the image transmitted to the associated telecentric stop in the magnification lens assembly that is then in its operative position. While the booster lens assembly shifts the object plane or front focal point otherwise produced by the entrance lens assembly 14, this does not seriously affect the telecentric conditions at the very high magnifications.

While this invention has been illustrated and described in detail in connection with only certain embodiments thereof, it will be apparent that it is capable of still further modification, and that this application is intended to cover any such modifications as may fall within the scope of one skilled in the art or the appended claims.

I claim:

1. A telecentric, multiple magnification optical system for projecting the combined images of a workpiece and reticle to the camera of associated video inspection apparatus, comprising, a first lens assembly secured to a movable support for movement thereby along a first axis toward and away from a workpiece, a beamsplitter mounted on said support adjacent the side of said first lens assembly remote from said workpiece, reticle projection means including a second lens assembly fixed on said support coaxially of a second axis parallel to and approximately coaxially of said first axis, and operative to project the image of a reticle in one direction through said beamsplitter and said first lens assembly and onto said workpiece, a video camera fixed to said support and having therein an image detector disposed coaxially of a third axis laterally spaced from and extending parallel to said first and second axes, said first lens assembly including a fixed objective lens having front and back focal points, respectively, and operable in an afocal mode to project a combined image of said workpiece and said reticle in the opposite direction through said first lens assembly to said beamsplitter, and means including a plurality of magnification lens assemblies movable selectively and one by one into an operative position between said beamsplitter and said camera to project a magnified image of said combined workpiece and reticle image along said third axis to said image detector in said camera, each of said magnification lens assemblies having a telecentric stop disposed to be positioned at said back focal point of said objective lens when a respective magnification lens assembly is in its operative position.

2. A telecentric, multiple magnification optical system as defined in claim 1, wherein the last-named means further includes a reflective surface interposed between said beamsplitter and the operative one of said magnification lens assemblies, and operative to reflect said combined image from said beamsplitter to said telecentric stop of the last-named assembly.

3. A telecentric, multiple magnification optical system as defined in claim 1, wherein said beamsplitter is a beamsplitter plate.

4. A telecentric, multiple magnification optical system as defined in claim 1, including a boosting lens removably secured to said first lens assembly to magnify said combined image projected by said fixed objective lens.

5. A telecentric, multiple magnification optical system as defined in claim 1, wherein said reticle projection means further includes a collimator mounted on said support at the side of said second lens assembly remote from said first lens assembly, said collimator having a reticle positioned over one end thereof, and a light source positioned at the opposite to project said image of said reticle to said second lens assembly.

6. A telecentric, multiple magnification optical system as defined in claim 1, wherein said second lens assembly has an F-number smaller than the respective F-number of each of said magnification lens assemblies.

7. A telecentric, multiple magnification optical system as defined in claim 1, wherein the distance from the telecentric stop of the magnification lens assembly in said operative position to said image detector of said camera is slightly larger than twice the distance from said objective lens to its front focal point.

8. A telecentric, multiple magnification optical system as defined in claim 2, wherein said last-named means further includes, a turret having therethrough a plurality of spaced openings equal in number to said magnification lens assemblies, means mounting said turret on said support for movement therewith, and for adjustment relative to said support into different positions of rest in each of which one of said openings in said turret registers with said reflective surface, and means mounting said magnification lens assemblies in spaced relation on said turret with the telecentric stops thereof lying in a common plane, and with each of said stops registering with one of said openings in said turret.

9. A telecentric, multiple magnification optical system as defined in claim 8, wherein said turret is mounted for rotation into said different positions of rest about a fourth axis spaced from and extending parallel to said first, second and third axes, and said common plane extends normal to said fourth axis.

10. A telecentric, multiple magnification optical system as defined in claim 8, wherein each of said magnification lens assemblies comprises a first lens barrel releasably secured at one end thereof coaxially in one of said openings in said turret, and a second lens barrel secured coaxially to the opposite end of said first barrel, said first lens barrel having in said one end thereof a telecentric stop opening lying in said common plane.

11. A telecentric, multiple magnification optical system as defined in claim 10, wherein said second lens barrel has therein at least one lens doublet for focusing said magnified image on said image detector of said camera when the associated magnification lens assembly of said second lens barrel is in its operative position.

12. In an optical system for projecting the combined images of a workpiece and a reticle to a video camera for inspection and autofocusing by an associated microprocessor (CPU) device, an objective lens assembly having fixed front and rear focal points, respectively, and secured on a support for movement thereby coaxially of a first axis toward and away from a workpiece, surface illuminator and reticle projection means on said support for simultaneously projecting in one direction through said objective lens assembly, and onto said workpiece, light from a source thereof and the image of a reticle, whereby a combined image of said workpiece and reticle is projected in an afocal mode in the opposite direction through said objective lens assembly, a magnification lens assembly mounted on said support coaxially of a second axis spaced from and parallel to said first axis, said magnification lens assembly registering at one end with the image detector of a video camera, and having in its opposite end a telecentric stop opening registering with the rear focal point of said objective lens assembly, and means interposed between said objective lens assembly and said telecentric stop for projecting said combined image coaxially through said telecentric stop and said magnification lens assembly to the image detector of said camera, said magnification lens assembly being one of several different magnification lens assemblies mounted on said support for movement selectively and one at a time into an operative position in which a respective one of said different assemblies is disposed coaxially of said second axis and has therein a telecentric stop opening registering with the rear focal point of said objective lens assembly.

13. In an optical system as defined in claim 12, wherein said surface illuminator and reticle projection means includes a collimator on said support having said light source at one end thereof and a reticle at the opposite end thereof, and a further lens assembly on said support between said opposite end of said collimator and said objective lens assembly and operative to project an image of said reticle toward said objective lens assembly along an axis parallel to and nearly coaxially of said first axis.

14. In an optical system as defined in claim 13, wherein said means interposed between said objective lens assembly and said telecentric stop comprises, a beamsplitter plate interposed between said objective lens assembly and said further lens assembly, and operative to pass said image of said reticle in said one direction to said objective lens asembly, and to reflect said combined image laterally in the direction of said second axis, and a reflective surface interposed between said beamsplitter and said telecentric stop and operative to direct said combined image from said beamsplitter to said telecentric stop coaxially thereof.

15. In an optical system as defined in claim 12, wherein each of said further lens assembly and said magnification lens assemblies has an F-number, and the F-number of said further lens assembly is less than the F-number of each of said magnification lens assemblies.

\* \* \* \* \*